Jan. 14, 1969     J. L. WEST     3,422,362
PHASE DETECTOR WITH LOW RIPPLE OUTPUT NEAR ZERO PHASE ANGLE
Filed March 17, 1967     Sheet 1 of 3

INVENTOR
JAMES L. WEST

BY Arnold, Roylance, Kruger & Durkee
ATTORNEYS

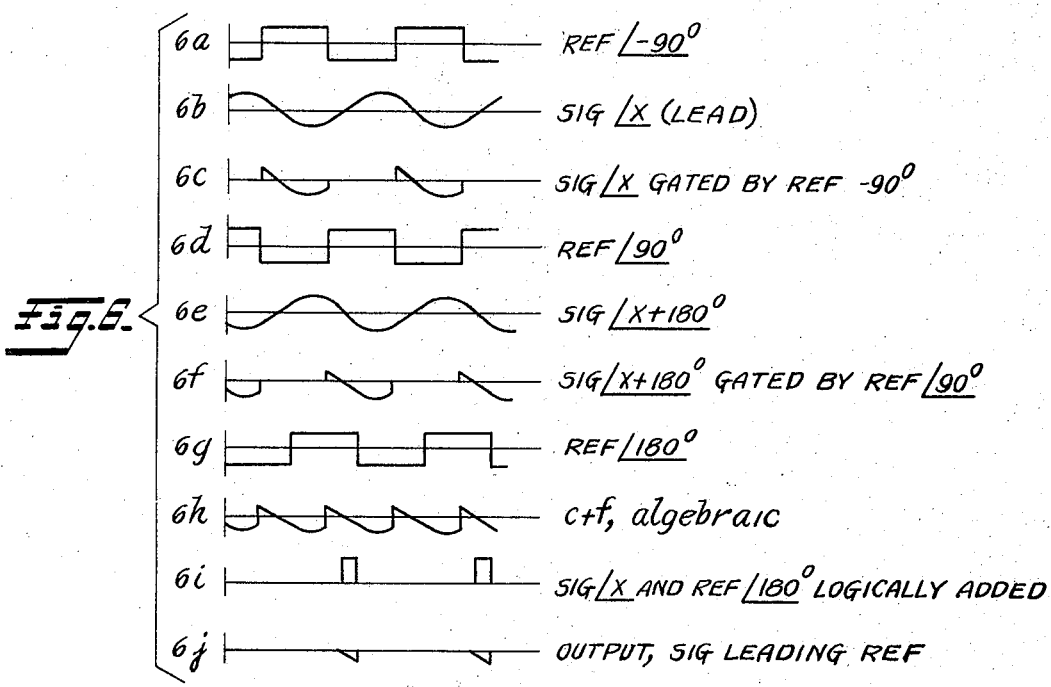

United States Patent Office 3,422,362
Patented Jan. 14, 1969

3,422,362
PHASE DETECTOR WITH LOW RIPPLE OUTPUT NEAR ZERO PHASE ANGLE
James L. West, Concord, Mass., assignor to Weston Instruments, Inc., Newark, N.J., a corporation of Delaware
Filed Mar. 17, 1967, Ser. No. 624,102
U.S. Cl. 328—134       5 Claims
Int. Cl. H03k *9/06;* H03d *3/02;* H03b *3/04*

ABSTRACT OF THE DISCLOSURE

Two reference signals separated by 180° switch an unknown phase input signal and its inverse, the switched signals then being summed. The unknown is logically added to a third reference 90° from the first two and the resulting signal gates the sum to provide an error signal which is zero when the unknown is in phase with the reference and is unidirectional when there is a phase difference.

---

This invention relates to phase comparator apparatus and, more specifically, to circuit apparatus for comparing two electrical signals and developing an error signal representative of particular phase relationships.

Phase comparators and phase detectors are broadly old in the electrical and electronic arts. Many varieties of such apparatus have been developed using widely varying techniques to suit the many needs of the industry. One type of detector in the prior art uses the technique of logically switching an input electrical signal with a reference signal to obtain an AC waveform, the polarity of the average value of which is representative of the direction of phase difference between the input signal and the reference. The filtered output of this type of detector is primarily DC, the magnitude of the DC signal being representative of the magnitude of phase difference.

Although the output of the above-described prior art phase detector is mostly DC, an AC component is nearly always present. The AC ripple can be eliminated, but to do so requires extensive filtering. Even when the input signal is exactly in phase with the reference signal, the ripple is present, the amplitude of the ripple being substantially constant (for any one preselected filtering system) regardless of the magnitude of the DC component. The existence of this ripple or the time delays of a filter can cause instability, or "hunting," when the phase detector is used as part of a closed loop system. As will be recognized by those skilled in the art, increased filtering means increased weight, size and cost in a practical piece of equipment.

An object of the present invention is to provide an improved phase detector apparatus.

Another object is to provide apparatus for comparing the phase angles of two electrical signals and for providing an error signal which goes to zero when the two signals are in phase.

A further object is to provide apparatus for determining the phase relationship between two signals and for producing a unidirectional error signal of one polarity when a phase difference exists in one direction, a unidirectional error signal of the other polarity when the phase difference is in the opposite direction, and a zero signal when there is no phase difference.

In a practical embodiment of the invention the foregoing objects are attained by providing the reference signal at three phase angles separated by 90 electrical degrees, and by using these signals to switch and gate the input (unknown) signal. The input signal is provided in two phase relationships separated by 180°, i.e., normal and inverted. Each of the two forms of the input signal is switched by one of two of the phases of the reference signal, the resulting signals being added. The remaining phase of the reference signal is logically combined with the input signal, the result of this combination being used to gate the summed signals.

In order that the manner in which the foregoing and other objects are attained in accordance with the invention can be understood in detail, a particularly advantageous embodiment thereof will be described with reference to the accompanying drawings, which form a part of this specification, and wherein:

FIGS. 4–6 are waveform diagrams which are helpful in considering the operation of the apparatus of FIG. 3.

Figure 1:
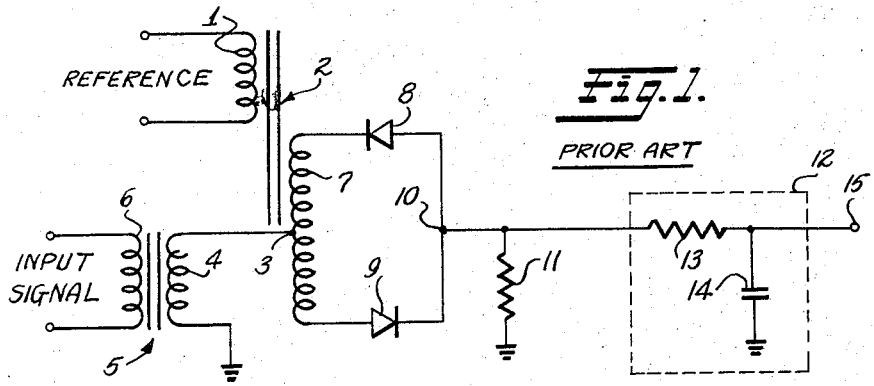
FIG. 1 is a schematic diagram of an example of the prior art.

FIG. 1 shows one example of a prior art phase comparator apparatus in which a reference signal, which advantageously has a rectangular waveform, is applied to the input terminals of a winding 1 of a transformer indicated generally at 2. A secondary winding 7 of transformer 2 has a center tap 3 which is connected to one terminal of the secondary winding 4 of an input transformer indicated generally at 5. An AC input signal is applied to the terminals of a primary winding 6 of transformer 5. The end terminals of secondary winding 7 of transformer 2 are connected to conventional semiconductor diodes 8 and 9, one terminal of winding 7 being connected to the cathode of diode 8 and the other terminal being connected to the anode of diode 9. The anode of diode 8 and the cathode of diode 9 are connected to a junction 10. A fixed resistor 11 is connected between junction 10 and ground. The output voltage of the phase comparator appears at junction 10 which can be connected to a filter circuit 12. A typical filter circuit, including a series resistor 13 and a parallel capacitor 14, is shown as filter 12. The output voltage of the filter appears at an output terminal 15.

Figure 2:
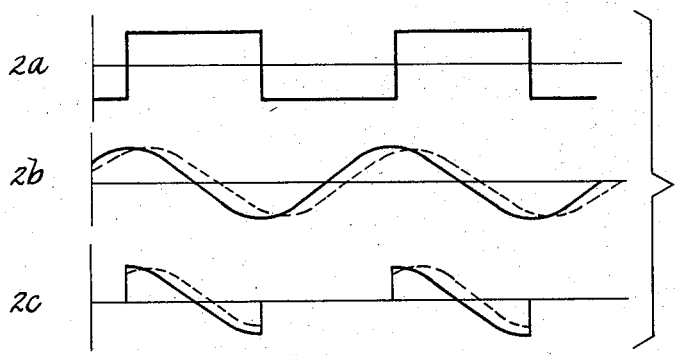
FIG. 2 is a waveform diagram showing the waveform which can occur in the apparatus of FIG. 1.

The operation of the circuit of FIG. 1 can be better understood by referring to the waveforms of FIG. 2 wherein waveform 2a is the reference voltage applied to winding 1, and the solid line portion of waveform 2b is the AC input signal applied to the terminals of primary winding 6. As will be recognized by those skilled in the art, waveform 2a is coupled through transformer 2 to diodes 8 and 9, the voltages developed at the end terminals of winding 7 being sufficient to bias diodes 8 and 9 into a conductive state when the voltage applied to winding 1 is positive and into a nonconductive or blocking state when the voltage applied to winding 1 is negative. Thus, during the positive half-cycle of waveform 2a a duplicate of the voltage applied to winding 6 appears at output terminal 10. This voltage is illustrated in waveform 2c, this voltage being a portion of a sinusoidal waveform, or whatever waveform is substituted for waveform 2b.

In FIG. 2, the situation illustrated is that wherein the input signal voltage is in phase with the desired reference voltage, the output shown in FIG. 2c being substantially symmetrical with respect to a zero voltage level. It will be recognized that waveform 2b is not in phase with waveform 2a. Thus, it must be said that the reference voltage actually applied to the input terminals of winding 1 is delayed from the desired reference by ninety electrical degrees.

To visualize the situation wherein the input signal is leading or lagging the desired reference, reference is made to the dotted waveform in FIG. 2b wherein the input signal is shown as lagging the desired reference. Again, the output voltage of the comparator circuit appears only when the reference voltage is positive. However, with a lagging input signal the output voltage is no longer symmetrical with respect to zero, the positive portion of the output signal being greater in total area enclosed within the curve than the negative portion. Thus, after filtering, the voltage appearing at output terminal 15 includes a significant positive DC potential, whereas an in-phase signal provides only an AC ripple voltage. A leading input signal, as will be recognized, provides an output signal which includes a greater negative portion, the output signal at terminal 15 then constituting a negative DC potential. However, in any circumstance the voltage appearing at output terminal 15 includes an AC ripple component because the voltage applied to the filter includes a significant AC component which cannot be totally eliminated with filter circuits of a practical size and complexity.

Figure 3:
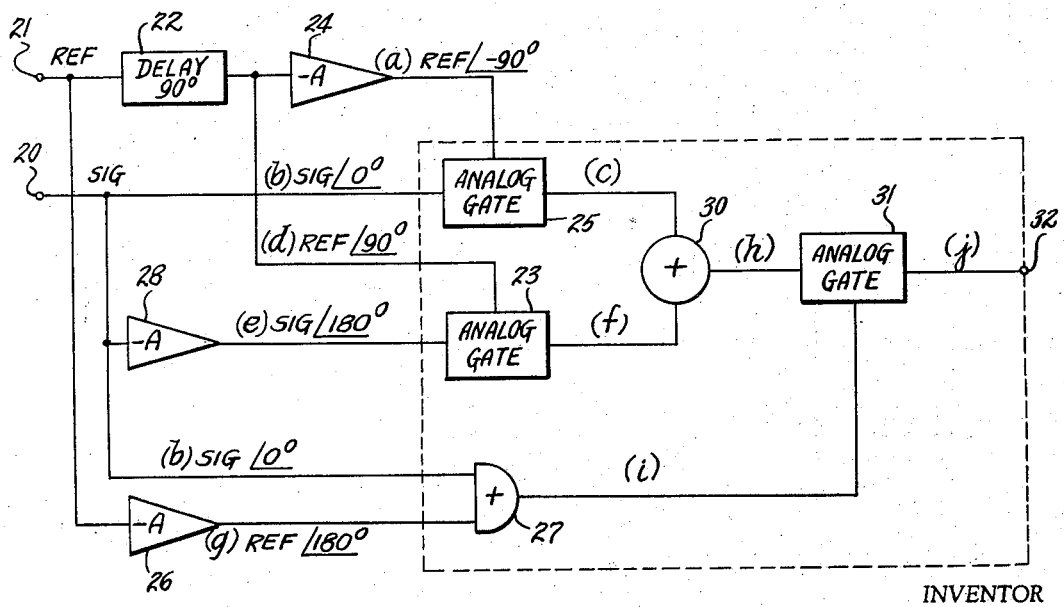
FIG. 3 is a schematic diagram of an apparatus in accordance with the present invention.

An embodiment of the invention is shown in FIG. 3 wherein an input signal voltage is applied to an input terminal 20 and a reference input signal is applied to an input terminal 21. With the circuit apparatus shown, it will be assumed that when an in-phase condition exists the voltage applied to terminal 20 is exactly in-phase with the voltage applied to terminal 21.

The reference input voltage is connected to a delay circuit 22 which is a conventional apparatus capable of shifting the phase of electrical signals applied thereto by ninety electrical degrees. The output of delay circuit 22 is connected to a control input terminal of an analog gate circuit 23. The output of delay circuit 22 is also connected to the input terminal of a conventional inverting amplifier 24 which normally has a gain of one and which inverts an electrical signal applied thereto, i.e., shifts the phase of the signal by 180°. The output of amplifier 24 is therefore shifted in phase by 270 electrical degrees from the angle of the voltage applied to terminal 21, and can be said to be disposed —90° from the input reference voltage. The output of amplifier 24 is applied to the control input terminal of an analog gate circuit 25.

The reference signal applied to terminal 21 is also connected to the input terminal of an inverting amplifier 26, the output of which is connected to one input terminal of an AND circuit 27. Inverting amplifier 26 is a conventional device capable of shifting a signal applied thereto by 180°, and can include sufficient amplification or attenuation to change the magnitude of the input signal by any desired amount. Because of the fact that the reference signal is frequently substantially greater in amplitude than the input signal, and because of the sensitivity of logical circuits such as AND circuit 27 to relative magnitudes, it is desirable that amplifier 26 include sufficient attenuation to render the amplitude of the reference signal substantially equal to that of the input signal.

The AC input signal to be analyzed is connected from input terminal 20 to the input terminal of analog gate circuit 25 in unmodified form. The input signal is also applied to the input terminal of an inverting amplifier 28, the output of which is connected to the input terminal of analog gate circuit 23. The input signal, in unmodified form, is also applied to the other input terminal of AND circuit 27.

The output terminals of analog gate circuits 23 and 25 are connected to the input terminals of a conventional summing circuit 30 which is capable of algebraically adding the voltages applied thereto. The output of summing circuit 30 is to the input terminal of an analog gate circuit 31, the control input terminal of which is connected to the output terminal of AND circuit 27. The output of analog gate circuit 31 is connected to an output terminal 32 which constitutes the output of the phase comparator and which can be connected to any suitable filtering circuit.

It will be recognized that the phase comparator itself includes the apparatus within the dotted line in FIG. 3, and that the delay circuits and inverting circuits shown in FIG. 3 are provided as one example of an apparatus which can be used to attain the proper phase relationships between the signals to be analyzed by the phase comparator circuit.

Analog gate circuits 23, 25 and 31 are gate circuits of a type which include a switchable conductive path between the input terminals and output terminals thereof, the conductive state of each of these paths being controlled by the polarity of the voltages applied to their input terminals. In the present example, it will be assumed that these gate circuits respond to positive voltages at their control input terminals to render the paths between their input and output terminals conductive. It will be recognized that the opposite convention can be followed by merely reversing the relative polarities or conductivity types of the circuit elements used therein.

Figure 4:
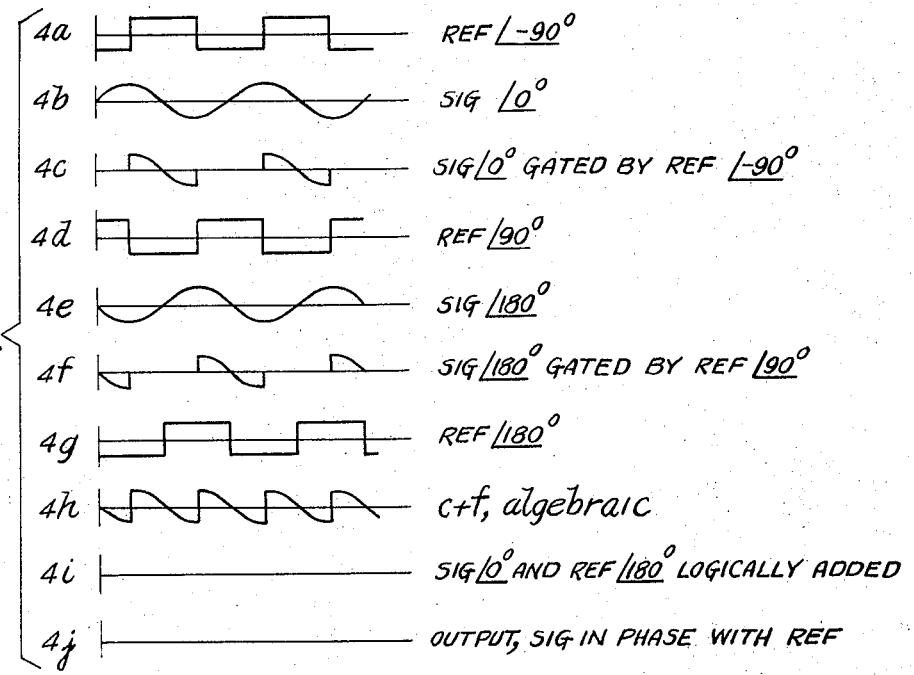
Figure 5:
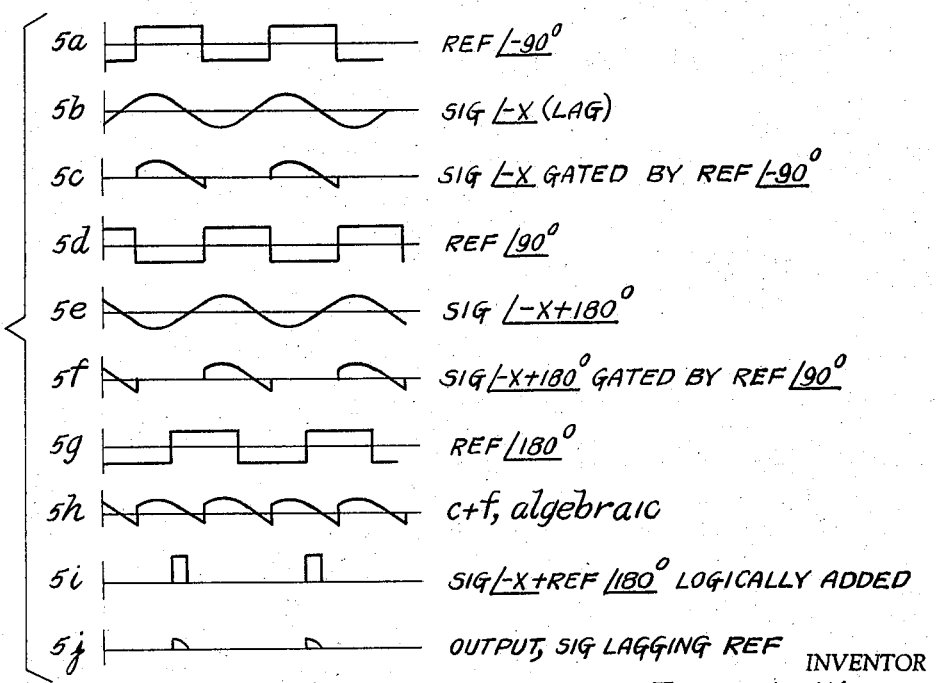

The operation of the apparatus of FIG. 3 can be understood by referring to the waveforms shown in FIGS. 4–6. In each of these figures, the letters $a$ through $j$ are used to identify the waveforms occurring at various points in the apparatus of FIG. 3, the three figures illustrating conditions in which the input signal is in phase with the reference signal (FIG. 4), the input signal is lagging the reference signal (FIG. 5), and the input signal is leading the reference signal (FIG. 6). The letters in these three figures correspond to the letters appearing at various points throughout the circuit of FIG. 3.

In FIG. 4, waveform 4a, 4d, and 4g show the reference signal delayed by —90°, +90°, and 180° respectively. The input AC waveform as it appears at input terminal 20 is shown in FIG. 4b. Thus, the waveforms of 4a and 4b illustrate the electrical signals applied to analog gate circuit 25, the waveform of 4b being switched within gate circuit 25 by waveform 4a. As in the prior art apparatus, gate circuit 25 permits passage of that portion of waveform 4b which occurs during the positive half-cycle of the reference signal, the output of gate circuit 25 being shown in waveform 4c. In similar fashion, waveforms 4d and 4e illustrate the electrical signals applied to gate 23, waveform 4e being switched by the rectangular reference signal shown in 4d. Waveform 4f is then the output of gate circuit 25, waveforms 4c and 4f being the inputs to summing circuit 30.

As mentioned above, the output of summing circuit is the algebraic sum of the outputs of the gate circuits, this sum being shown in waveform 4h. Waveform 4h is then the input signal to analog gate 31.

AND circuit 27 is provided with the electrical signals shown in waveforms 4b and 4g. AND circuit 25 is a conventional logical element of the type which provides an output signal only when both of the input signals applied thereto are of the same polarity, in this case when both are positive. As shown in FIG. 4, when the AC input signal is exactly in phase with the reference signal, it necessarily follows that the input signal must be precisely 180° out of phase from the inverted reference signal, as shown in 4g. Thus, there is no time when AND circuit 27 is provided with two positive signals simultaneously, and there is therefore no output signal from the AND circuit and no input signal to gate 31. This absence is shown in FIG. 4i. With no input to the control terminal of gate circuit 31, there is no output signal from gate circuit 31, this being shown in 4j. Thus it has been seen that when the input and reference signals are precisely in phase the output signal is at zero level, there being no DC level and also no AC ripple voltage at output terminal 32.

Now consider in FIG. 5, in which the input signal lags the reference voltage signal by an unkown angle identified as —X, the negative sign being used to indicate the existence of a lagging condition. When the lagging voltage is gated by the reference at —90° in gate circuit 25, the output voltage appears as shown in waveform 5c with a preponderance of the voltage being positive. Likewise, when the inverted signal in 5e is gated by the reference at 90°, as shown in 5d, the output of gate circuit 23 is as shown in 5f, also with a larger positive portion. The algebraic sum of the gate outputs is shown in FIG. 5h.

In the lagging condition shown in FIG. 5, AND circuit 27 is supplied with a positive voltage during a relatively short interval as will be seen by comparing FIGS. 5b and 5g. The resulting signal is shown in 5i and constitutes a relative short positive pulse, the time duration of which is directly proportional to the magnitude of angle X but the amplitude of which bears no particular relationship to the amplitude of the either of the reference or input signals. The spaced pulses shown in 5i are applied to the control terminal of gate circuit 31, rendering gate circuit 31 conductive for the relatively short time occupied by these pulses and allowing a portion of the double frequency waveform shown in 5h to pass. The output signal appearing at output terminal 32 is therefore a series of spaced pulses as shown in 5j wherein the time duration and the amplitude of the pulses is proportional to the phase difference between the reference and input signals. It should be noted that all of these signals emanating from gate circuit 31 are of the same polarity.

In FIG. 6, a condition is shown in which the input signal leads the reference signal by an unknown angle X. The input signal and the input signal inverted are gated as before by the reference signals, these outputs being summed as shown in waveform 6h. In this case, the logical addition of the input signal and the inverted reference signal results in a series of spaced pulses as shown in waveform 6i, these signals being used to render gate 31 conductive to pass portions of waveform 6h to output terminal 32. It should be noted that the output signal includes a plurality of spaced pulses all of which are of the same polarity and the amplitudes and durations of which are directly related to the phase difference between the input and reference signals.

From FIGS. 4–6, it can be seen that the apparatus of FIG. 3 produces a unidirectional output signal which is positive when the AC input signal lags the reference voltage and which is negative when the input signal leads the reference voltage. Perhaps more significantly, when the reference and input signals are in phase the voltage at output terminal 32 is exactly zero. Thus, the problems inherent in an output ripple voltage continually existing at the output of the comparator circuit are completely eliminated. It will be recognized that the pulses shown in FIGS. 4j–6j can be filtered to provide a DC voltage representative of the phase relationships between the input and reference signals, and that this DC voltage will, in most circumstances, include an AC ripple factor. However, the presence of a ripple voltage superimposed on the DC level has relatively little significance because it is transistory in nature in a closed loop system. The more significant feature is that when the phase difference approaches and reaches zero, the AC ripple disappears along with the DC component.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for determining the phase relationship between two electrical signals comprising the combination of means for accepting an electrical signal to be used as a reference and for producing three reference signal phase separated from each other and from said electrical signal by 90 electrical degrees; means for accepting an input signal to be compared to said reference signal and for providing the input signal in inverted form; first gate circuit means for accepting said input signal and one of said reference signal phases and for providing at an output terminal a duplicate of said input signal only during one half cycle of said reference signal phase; second gate circuit means for accepting said input signal in inverted form and a second one of said reference signal phases and for providing at an output terminal a duplicate of said input signal only during one half cycle of said second reference signal phase; summing circuit means for summing the products of said first and second gate circuit means; logic circuit means for adding said input signal and said third reference signal phase to produce spaced gate pulses; and third gate circuit means having an output terminal for conducting the output of said summing circuit means to said output terminal only during the existence of gate pulses from said logic circuit means, the average value of the voltage at said output terminal being proportional to the phase difference between said electrical signal and said input signal and the polarity of the voltage being indicative of the direction of phase difference.

2. An apparatus for determining the direction and magnitude of phase deviation of an AC input signal from a preselected reference phase comprising the combination of first gate means for switching the AC input signal at a reference signal rate; second gate means for switching an inverted form of the AC input signal at the reference signal rate, said second gate means being synchronized to said first gate means to switch said AC input signal ON when said first means is switching said signal OFF; summing means for algebraically summing the outputs of said first and second gate means to produce a signal at twice the frequency of said AC input signal; logic circuit means for logically adding the AC input signal and an inverted reference signal, the phase of the reference signal being 180 electrical degrees from the preselected reference phase; and third gate circuit means for switching the double-frequency signal produced by said summing means with the signal produced by said logic circuit means to produce an output signal of one polarity when the AC input signal leads the preselected reference phase, an output signal of the other polarity when the AC input signal lags the preselected reference phase, and no output signal when the AC input signal is in phase with the reference.

3. A phase comparator apparatus for generating an electrical signal representative of the phase difference between an AC input signal and a reference signal, the apparatus comprising the combination of first gate circuit means for switching the AC input signal with a delayed reference signal, the reference signal being delayed by 270 electrical degrees; second gate circuit means for switching an inverted form of the AC input signal with a delayed reference signal, the reference signal being delayed by 90 electrical degrees; summing circuit means for algebraically summing the output signals produced by said first and second gate circuit means to produce a signal having a frequency twice that of the AC input signal; logic circuit means for logically adding the AC input signal and an inverted form of the reference signal; and third gate circuit means for switching the double frequency signal produced by said summing circuit means with the signal produced by said logic circuit means to produce an output signal of one polarity when the AC input signal leads the undelayed reference signal, an output signal of the opposite polarity when the AC input signal lags the undelayed reference signal, and no output signal when the AC input signal is in phase with the undelayed reference signal.

4. A phase comparator according to claim 3 wherein said first, second and third gate circuit means each comprises a gate circuit having a switchable conductive path, an input terminal and an output terminal at the ends of the conductive path, and a control terminal, said gate circuit being responsive to a signal of one preselected polarity at said control terminal to provide at said output terminal a duplicate of an input signal supplied to said input terminal.

5. An apparatus for determining the phase relationship between two electrical signals comprising the combination of means for accepting an electrical signal to be used as a reference and for producing three reference signal phases separated from each other and from said electrical signal by 90 electrical degrees; means for accepting an input signal to be compared to said reference signal and for providing the input signal in inverted form; first gate circuit means for accepting said input signal and one of said reference signal phases and for providing at an output terminal a duplicate of said input signal only during one half cycle of said reference signal phase; second gate circuit means for accepting said input signal in inverted form and a second one of said reference signal phases and for providing at an output terminal a duplicate of said input signal only during one half cycle of said second reference signal phase; logic circuit means for adding said input signal and said third reference signal phase to produce spaced gate pulses; and summing circuit means for algebraically adding at least the portions of the signals from said first and second gate circuit means which exist during the times occupied by said spaced pulses.

References Cited

UNITED STATES PATENTS

| | | | |
|---|---|---|---|
| 3,094,666 | 6/1963 | Smith | 328—133 X |
| 3,265,976 | 8/1966 | Broadhead | 329—137 |
| 3,329,895 | 7/1967 | Lenz | 324—83 |

JOHN S. WEYMAN, *Primary Examiner.*

U. S. Cl. X.R.

324—83; 328—110; 329—110, 137

Disclaimer and Dedication 3,422,362.—*James L. West*, Concord, Mass. PHASE DETECTOR WITH LOW RIPPLE OUTPUT NEAR ZERO PHASE ANGLE. Patent dated Jan. 14, 1969. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]